United States Patent
Jang et al.

(10) Patent No.: US 10,812,795 B2
(45) Date of Patent: Oct. 20, 2020

(54) METHOD FOR PROCESSING PICTURE BASED ON INTRA-PREDICTION MODE AND APPARATUS FOR SAME

(71) Applicant: LG Electronics Inc., Seoul (KR)

(72) Inventors: Hyeongmoon Jang, Seoul (KR); Jin Heo, Seoul (KR)

(73) Assignee: LG ELECTRONIC INC., Seoul (KR)

( * ) Notice: Subject to any disclaimer, the term of this patent is extended or adjusted under 35 U.S.C. 154(b) by 0 days.

(21) Appl. No.: 16/337,125

(22) PCT Filed: Sep. 25, 2017

(86) PCT No.: PCT/KR2017/010542
§ 371 (c)(1),
(2) Date: Mar. 27, 2019

(87) PCT Pub. No.: WO2018/062788
PCT Pub. Date: Apr. 5, 2018

(65) Prior Publication Data
US 2019/0222839 A1    Jul. 18, 2019

Related U.S. Application Data

(60) Provisional application No. 62/401,913, filed on Sep. 30, 2016.

(51) Int. Cl.
*H04N 19/11* (2014.01)
*H04N 19/176* (2014.01)
(Continued)

(52) U.S. Cl.
CPC ........... *H04N 19/11* (2014.11); *H04N 19/105* (2014.11); *H04N 19/176* (2014.11); *H04N 19/463* (2014.11); *H04N 19/593* (2014.11)

(58) Field of Classification Search
None
See application file for complete search history.

(56) References Cited

U.S. PATENT DOCUMENTS

2007/0177668 A1*  8/2007  Park ............... H04N 19/176
                                                   375/240.12
2014/0098189 A1*  4/2014  Deng .............. H04N 19/176
                                                   348/43
(Continued)

FOREIGN PATENT DOCUMENTS

KR      2012-0129726 A    11/2012
KR      10-1618484 B1      8/2014
(Continued)

*Primary Examiner* — Frederick D Bailey
(74) *Attorney, Agent, or Firm* — Dentons US LLP

(57) ABSTRACT

A method and a device for processing an intra prediction mode based video are disclosed. More specifically, a method for processing a video based on an intra-prediction mode may include determining a left prediction mode and an upper prediction mode using a prediction mode of a block neighboring a current block, wherein the left prediction mode and the upper prediction mode are determined based on a split structure of the block neighboring the current block; constructing a most probable mode (MPM) candidate list of the current block using the left prediction mode and the upper prediction mode; determining a prediction mode of the current block using a MPM index indicating a specific prediction mode in the MPM candidate list; and generating a prediction block of the current block using the prediction mode of the current block.

19 Claims, 16 Drawing Sheets

(51) Int. Cl.
*H04N 19/105* (2014.01)
*H04N 19/593* (2014.01)
*H04N 19/463* (2014.01)

(56) References Cited

U.S. PATENT DOCUMENTS

2019/0208201 A1* 7/2019 Yasugi ................ H04N 19/105
2020/0059644 A1* 2/2020 Lee ..................... H04N 19/157

FOREIGN PATENT DOCUMENTS

| KR | 10-1516347 B1 | 5/2015 |
| KR | 2015-0065913 A | 6/2015 |
| KR | 10-2015-0095253 A | 8/2015 |
| KR | 10-1611409 B1 | 4/2016 |

* cited by examiner

【Figure 1】
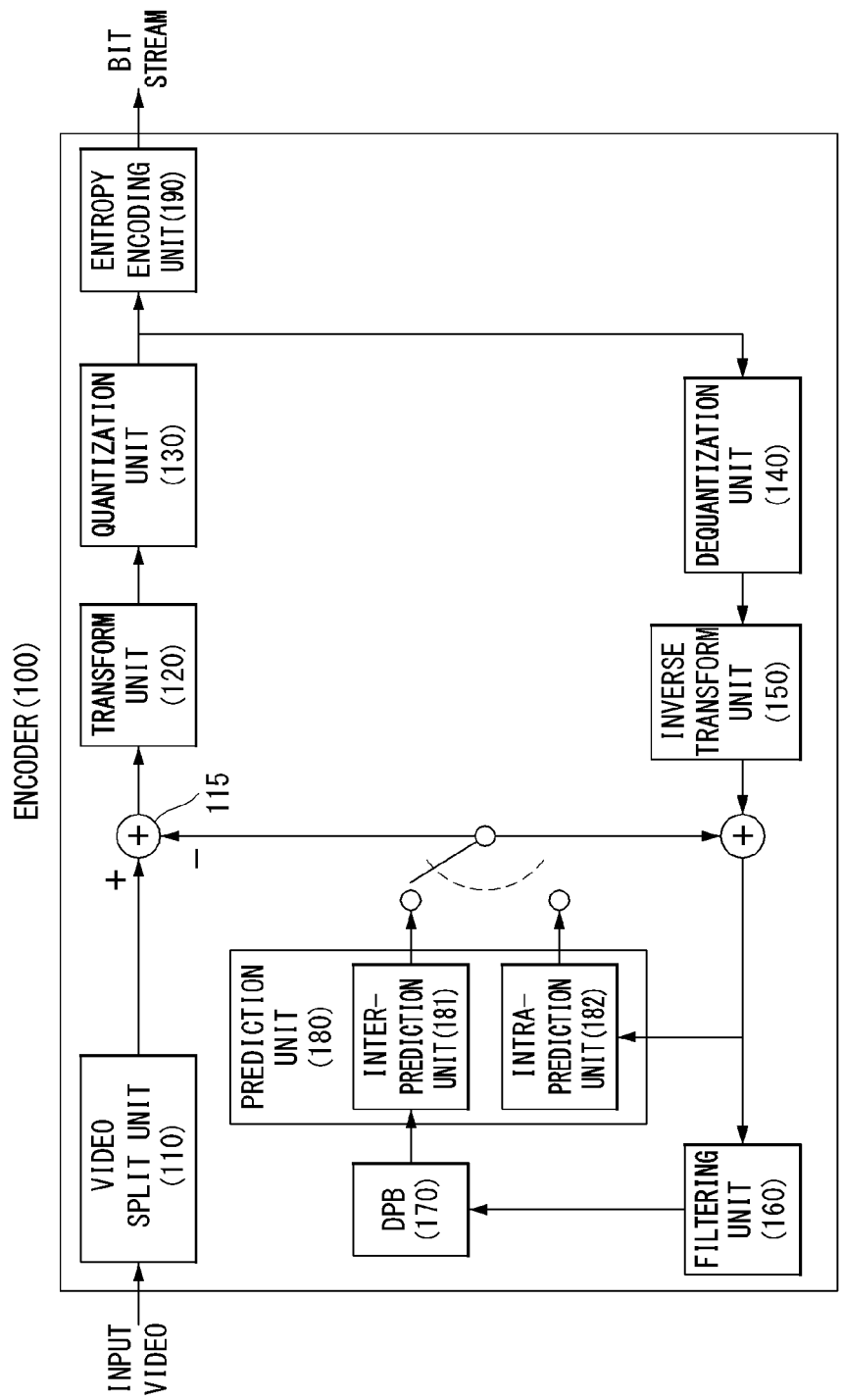

[Figure 2]
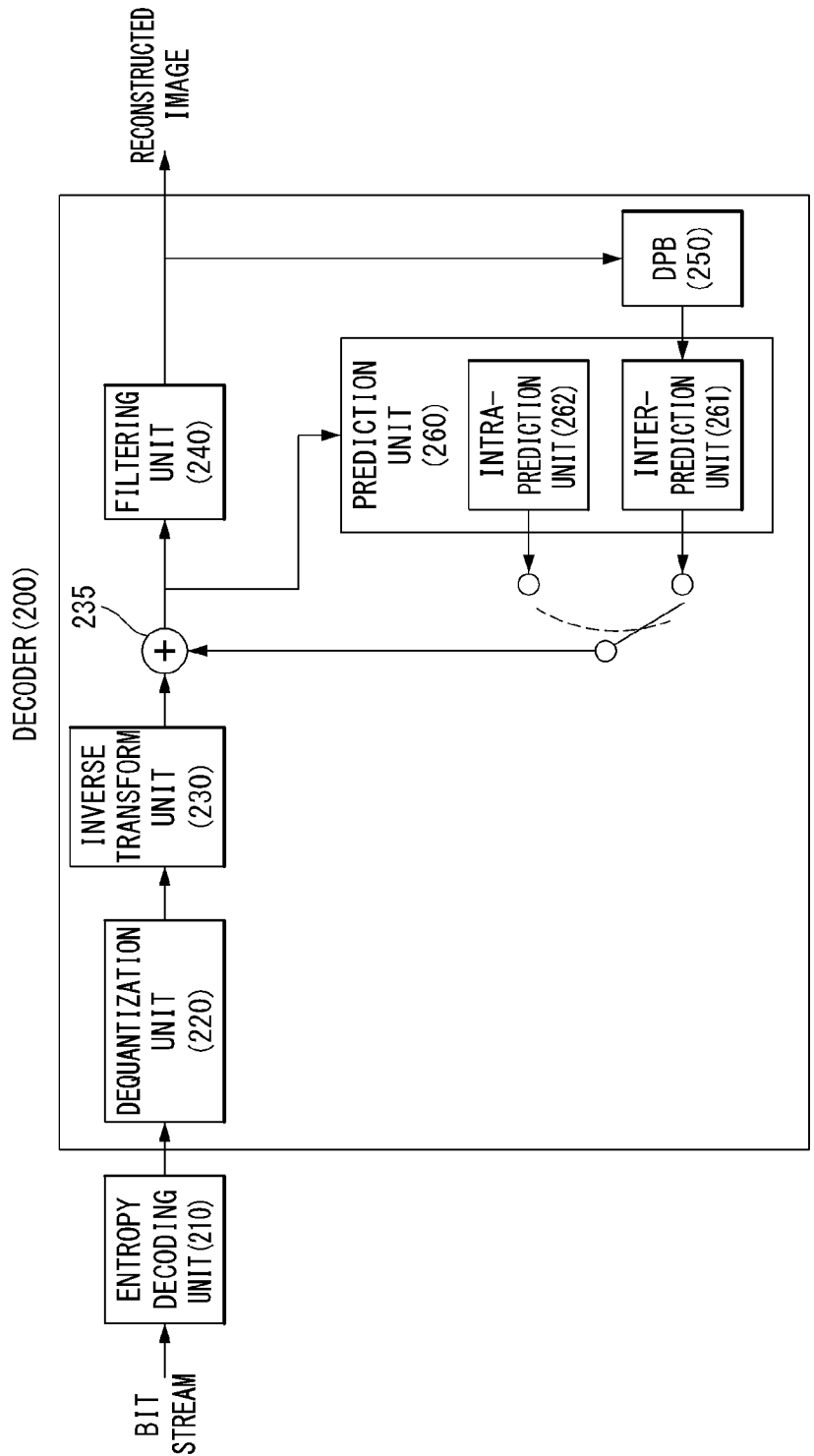

【Figure 3】
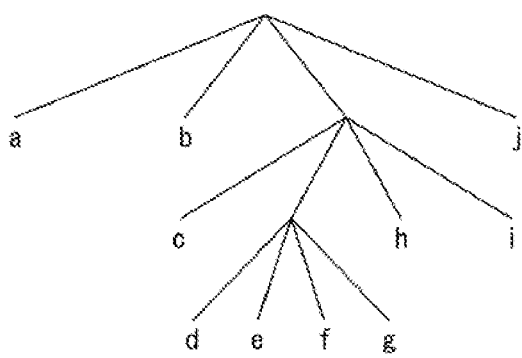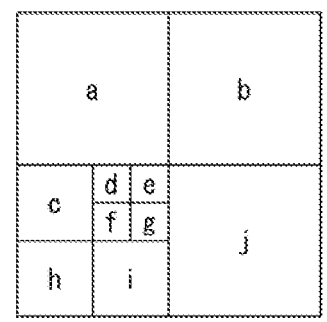
(a)            (b)

[Figure 4]
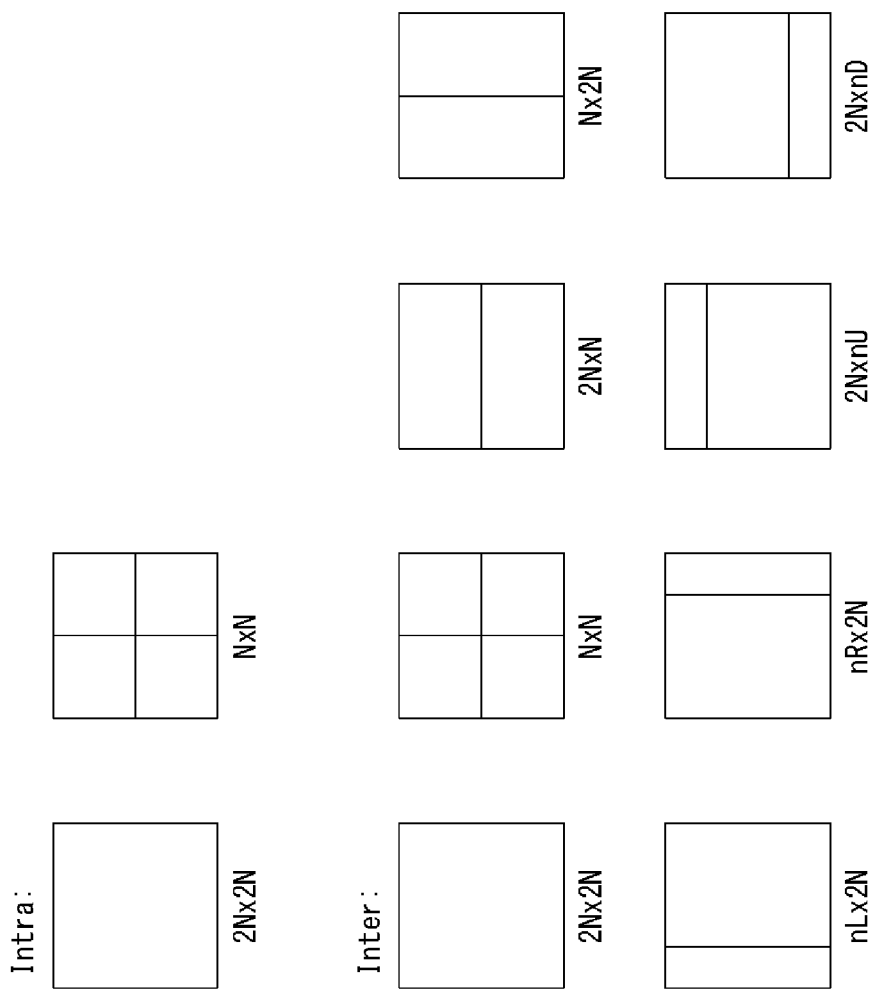

【Figure 5】
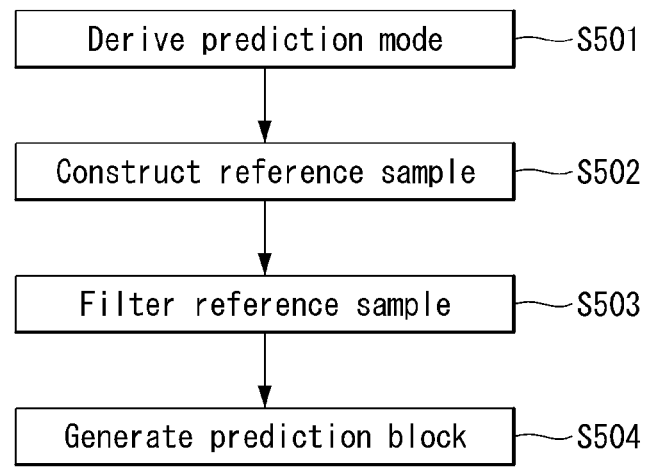

【Figure 6】
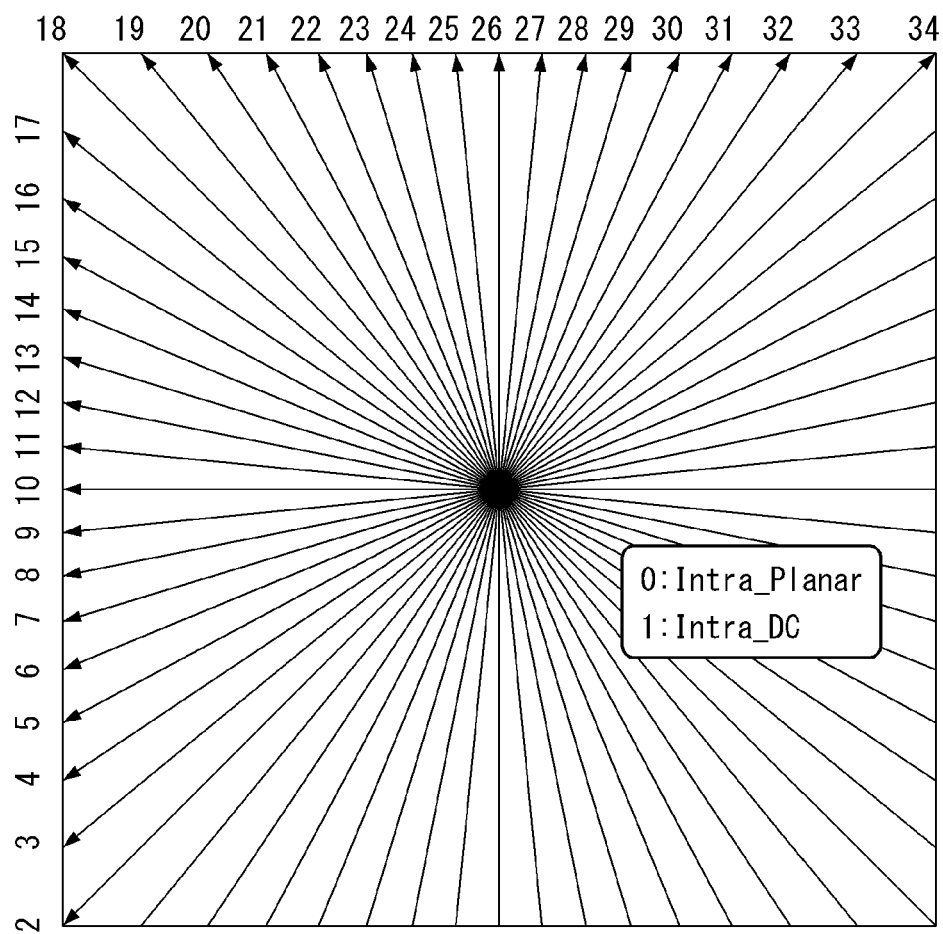

[Figure 7]
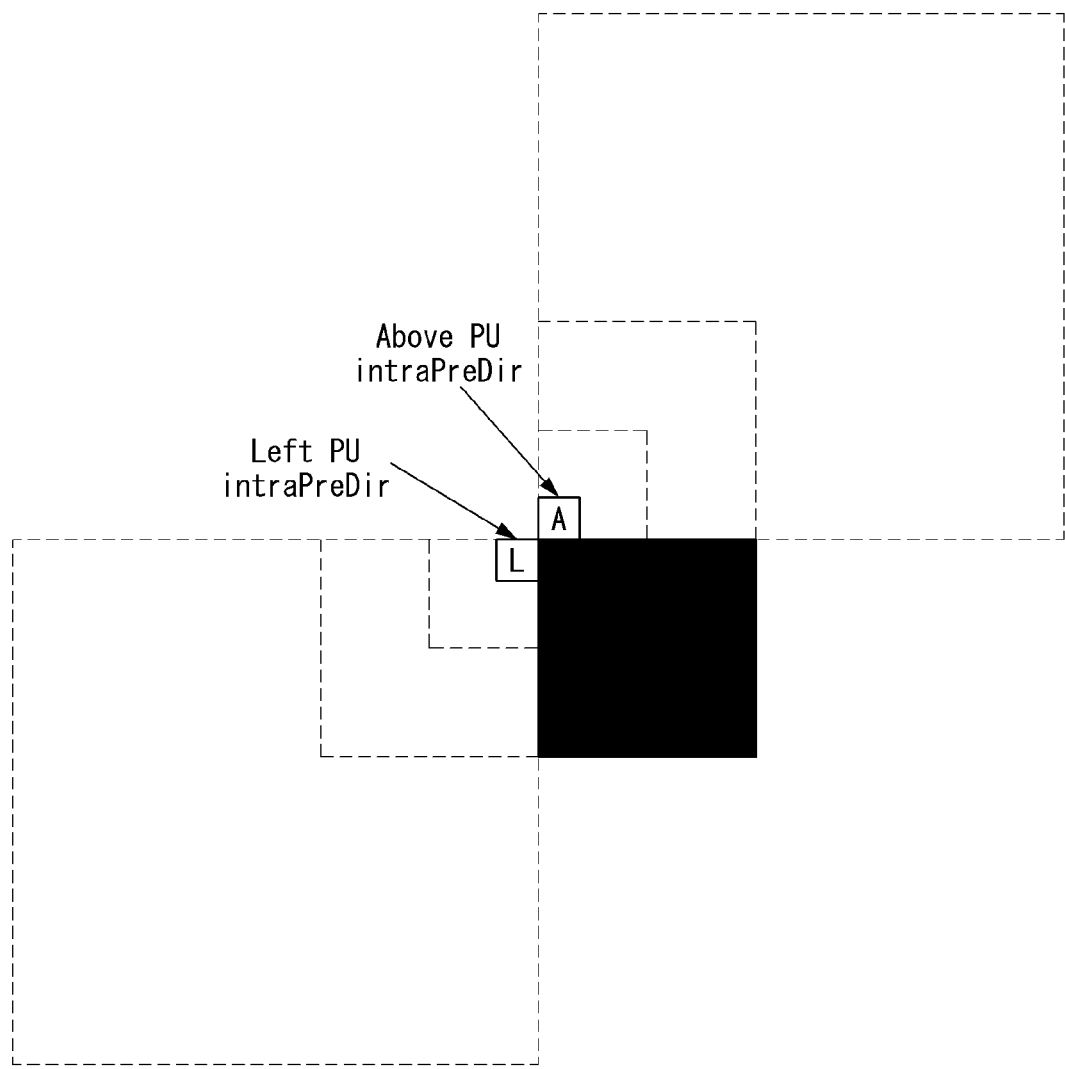

【Figure 8】
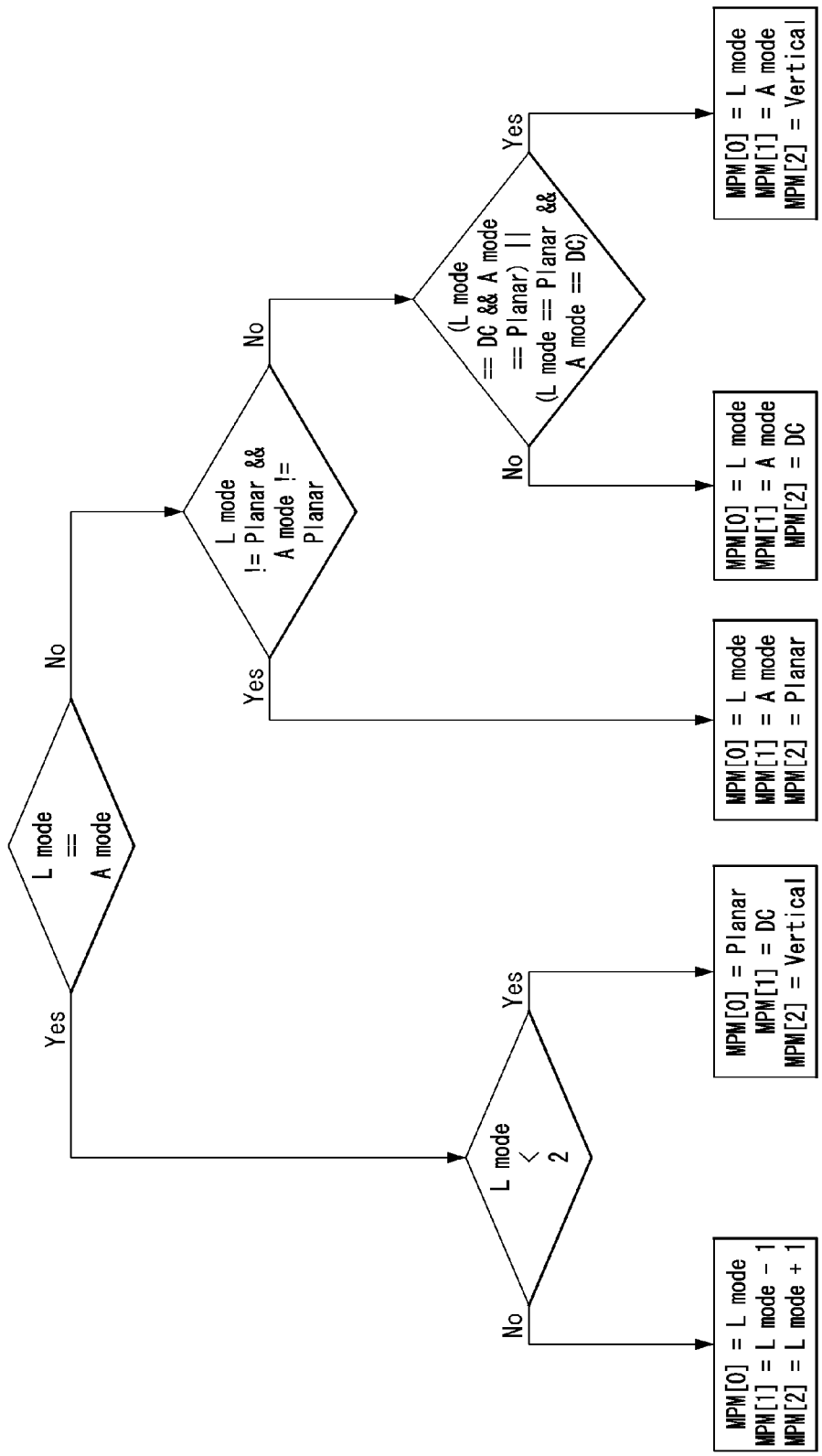

[Figure 9]
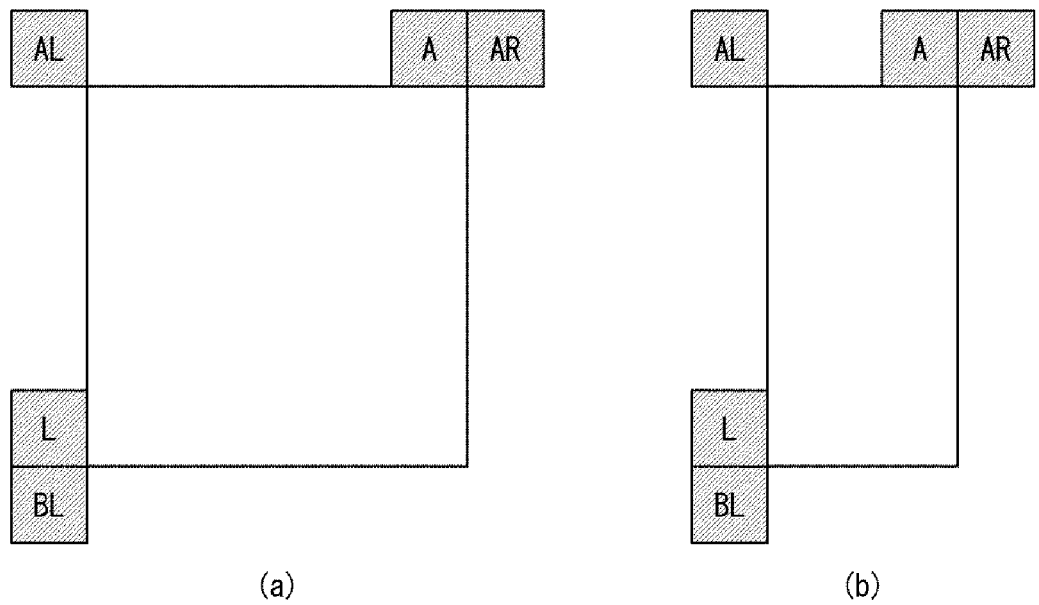
(a)  (b)
[Figure 10]
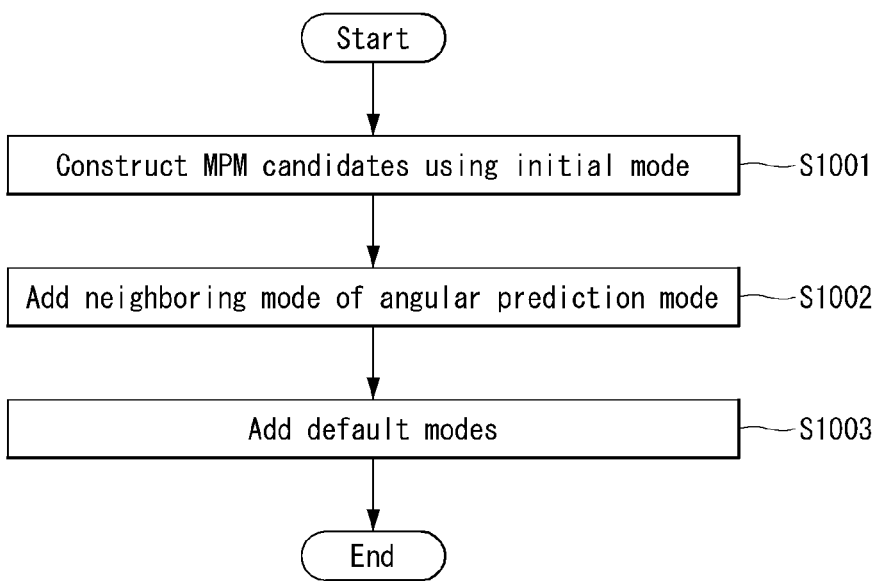

[Figure 11]
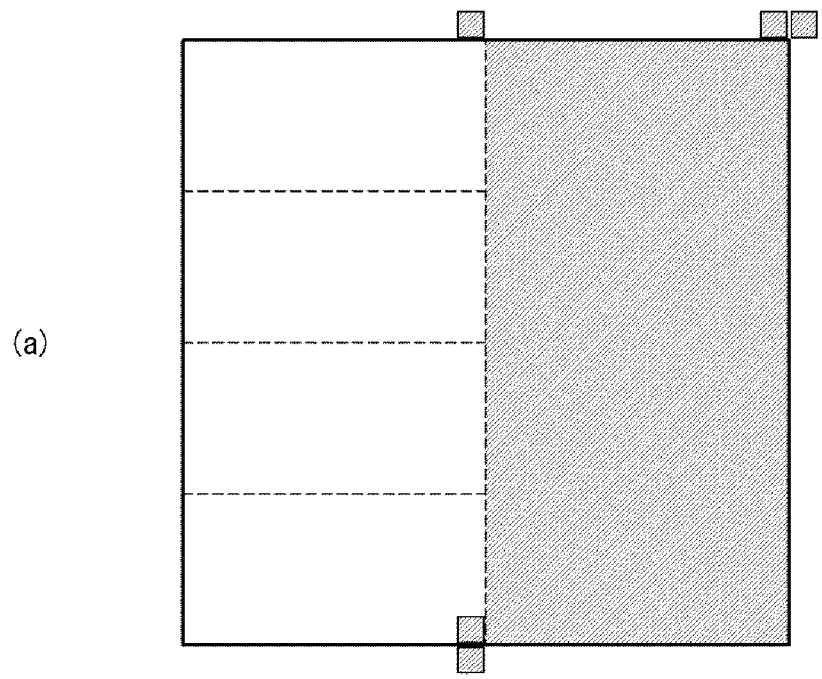
(a)
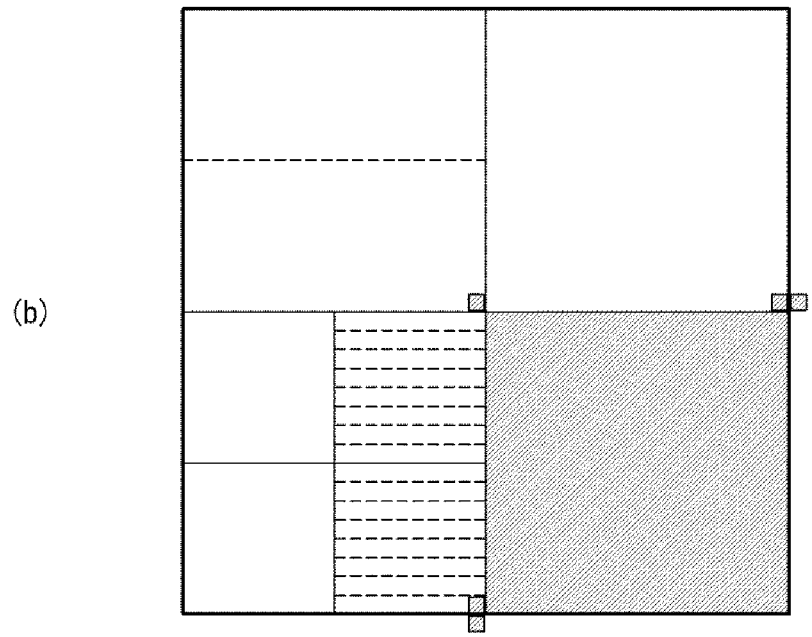
(b)

【Figure 12】
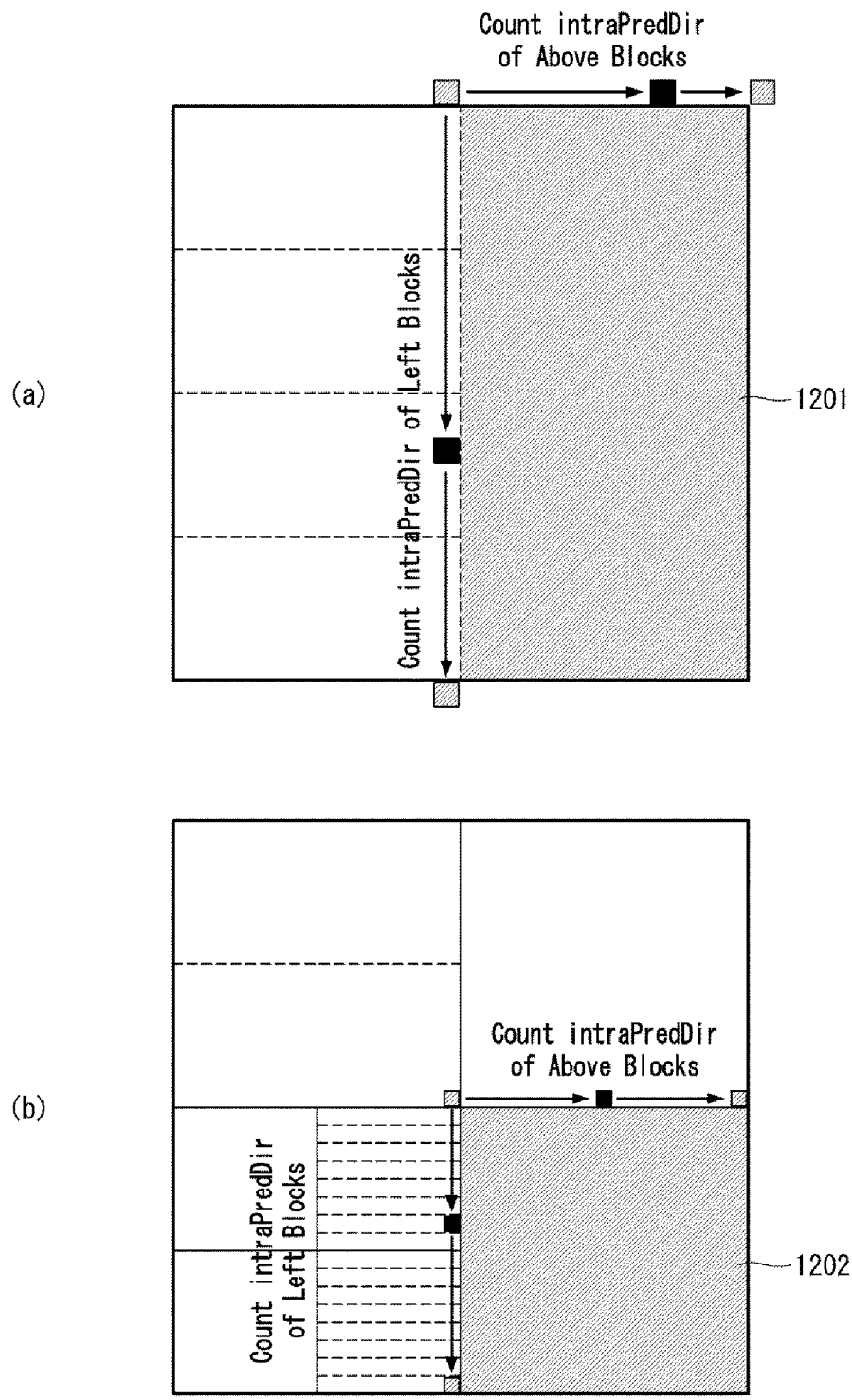

【Figure 13】
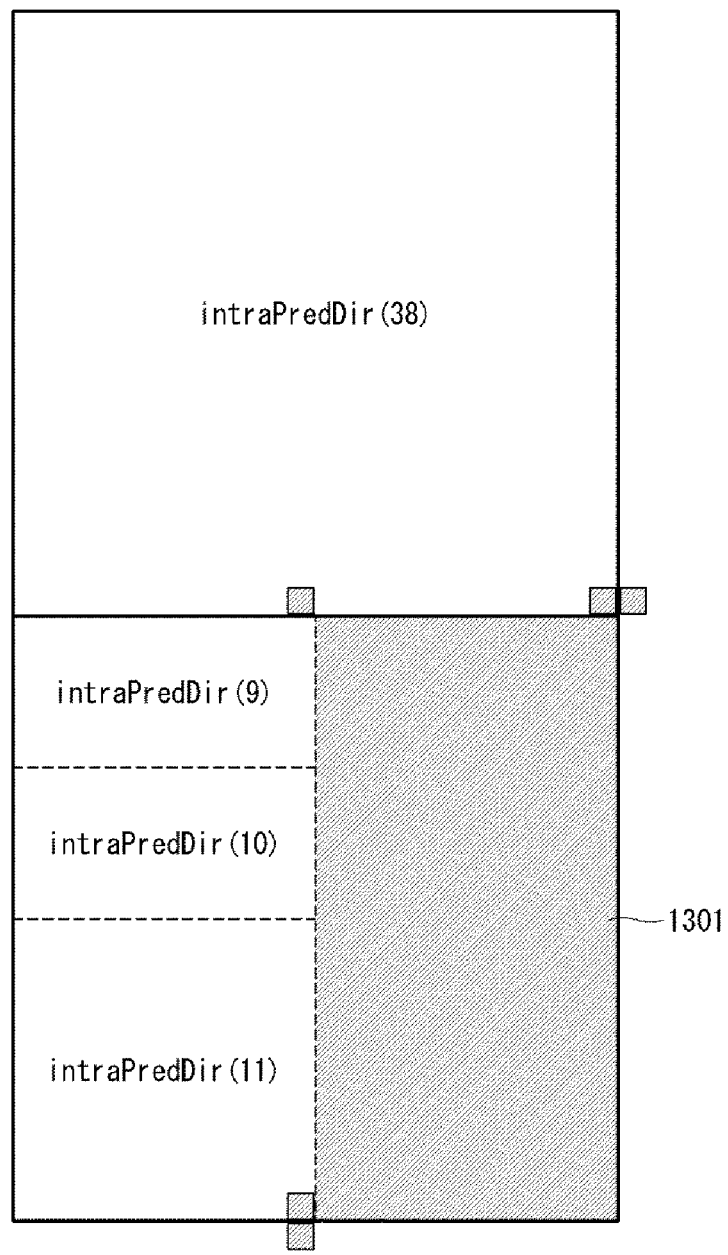

[Figure 14]
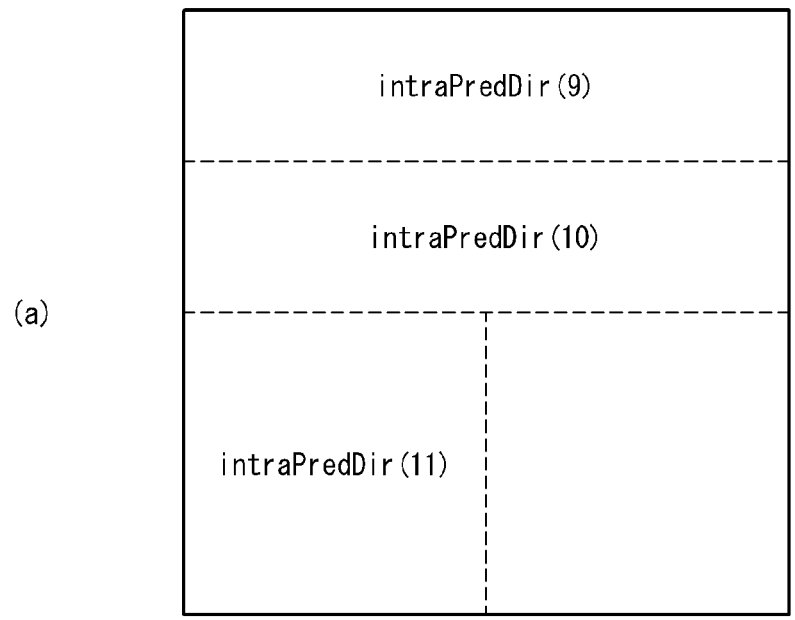
(a)
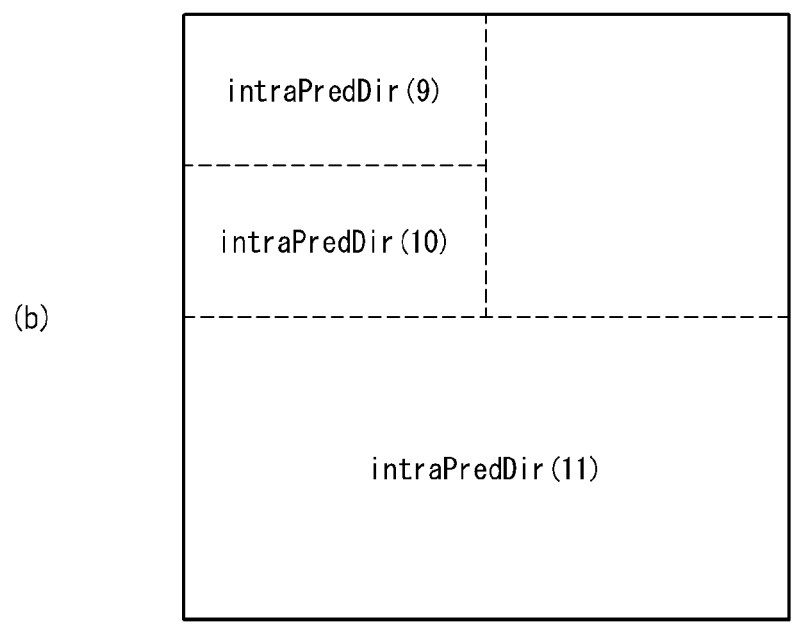
(b)

[Figure 15]
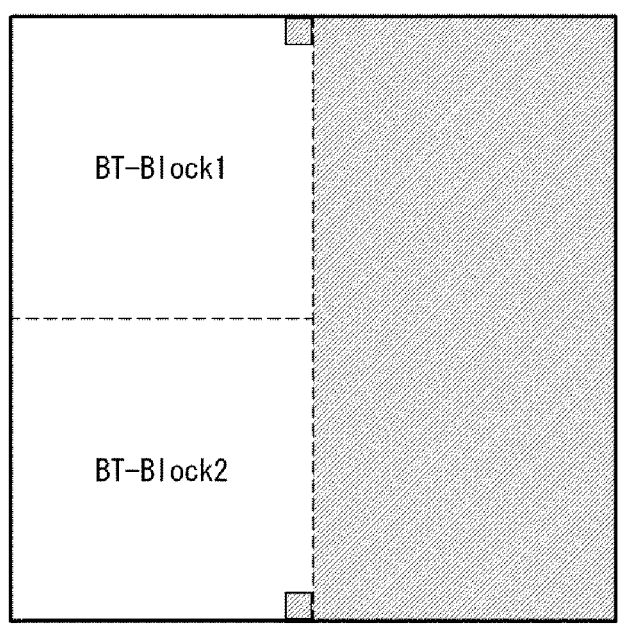

[Figure 16]
(a) 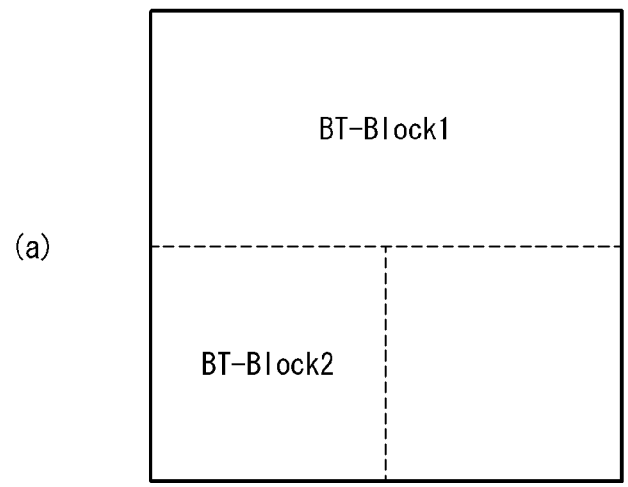
(b) 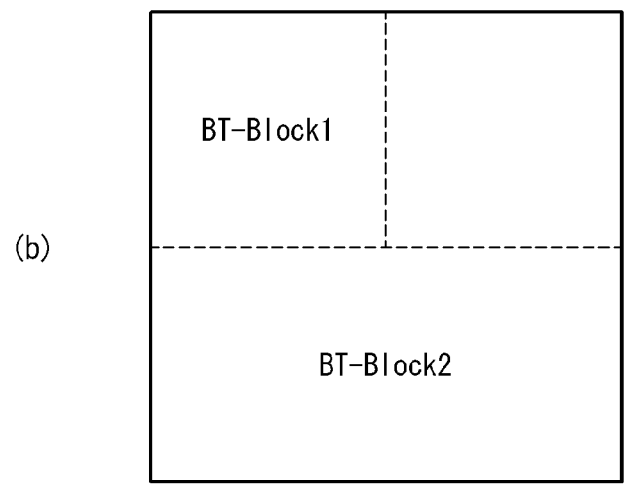
(c) 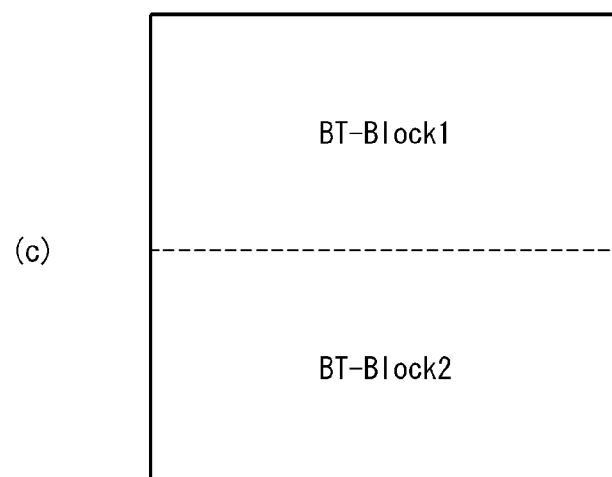

【Figure 17】
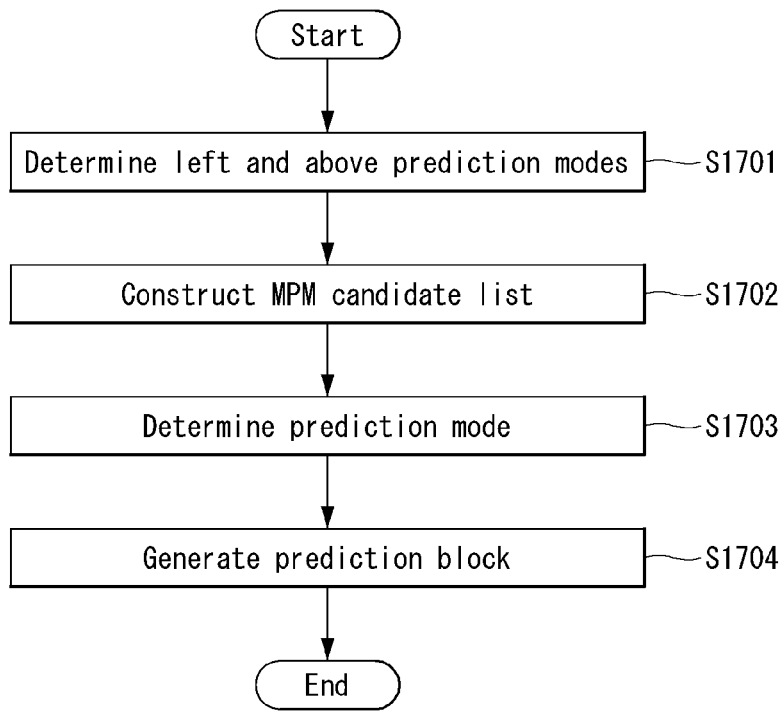
【Figure 18】
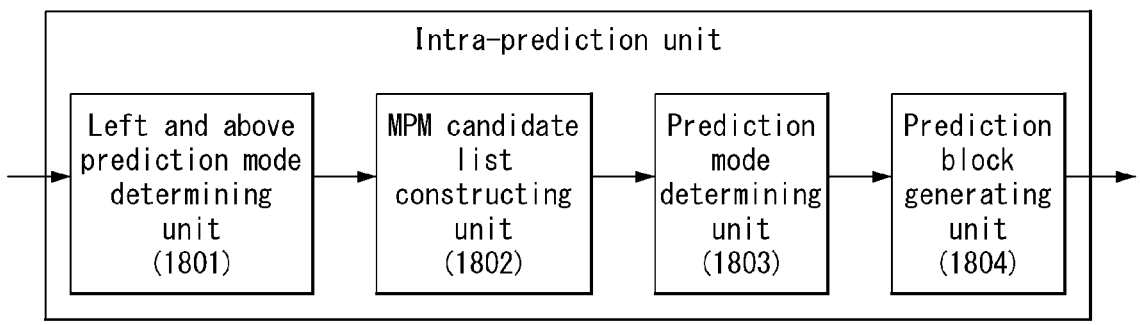

METHOD FOR PROCESSING PICTURE BASED ON INTRA-PREDICTION MODE AND APPARATUS FOR SAME

CROSS-REFERENCE TO RELATED APPLICATIONS

This application is the National Stage filing under 35 U.S.C. 371 of International Application No. PCT/KR2017/010542, filed on Sep. 25, 2017, which claims the benefit of U.S. Provisional Applications No. 62/401,913, filed on Sep. 30, 2016, the contents of which are all hereby incorporated by reference herein in their entirety.

TECHNICAL FIELD

The present invention relates to a method for processing a still image or a moving picture, and more particularly to a method for encoding/decoding a still image or a moving picture based on an intra-prediction mode and a device supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

A method for performing an intra-frame prediction using more intra-frame prediction modes compared to an existing intra-frame prediction method (or intra-prediction method) has been recently discussed.

An object of the present invention is to propose a method for efficiently constructing a most probable mode (MPM) for representing increased intra-frame prediction modes with fewer bits.

Another object of the present invention is to propose a method for constructing MPM candidates based on a probability of occurrence of a prediction mode of a neighboring block.

Another object of the present invention is to propose a method for adaptively constructing MPM candidates in consideration of a split structure of quad-tree plus binary tree (QTBT).

Technical problems to be solved by the present invention are not limited by the above-mentioned technical problems, and other technical problems which are not mentioned above can be clearly understood from the following description by those skilled in the art to which the present invention pertains.

Technical Solution

In one aspect of the present invention, there is provided a method for processing a video based on an intra-prediction mode, the method comprising determining a left prediction mode and an upper prediction mode using a prediction mode of a block neighboring a current block, wherein the left prediction mode and the upper prediction mode are determined based on a split structure of the block neighboring the current block; constructing a most probable mode (MPM) candidate list of the current block using the left prediction mode and the upper prediction mode; determining a prediction mode of the current block using a MPM index indicating a specific prediction mode in the MPM candidate list; and generating a prediction block of the current block using the prediction mode of the current block.

Preferably, the determining of the left prediction mode and the upper prediction mode may comprise counting a number of prediction modes per a pixel adjacent to a left or upper boundary of the current block, and the left prediction mode or the upper prediction mode may be determined based on the number of counted prediction modes.

Preferably, the determining of the left prediction mode and the upper prediction mode may comprise checking whether blocks neighboring left and upper sides of the current block are split. When a block neighboring the left side of the current block is split, the left prediction mode may be determined based on the number of counted prediction modes per a pixel adjacent to the left boundary. When a block neighboring the upper side of the current block is split, the upper prediction mode may be determined based on the number of counted prediction modes per a pixel adjacent to the upper boundary.

Preferably, the method may further comprise giving a higher priority to the left prediction mode or the upper prediction mode based on whether a block neighboring a left or upper side of the current block is split.

Preferably, the constructing of the MPM candidate list may comprise adding an additional prediction mode to the MPM candidate list, and the additional prediction mode may include at least one of a planar mode, a DC mode, a vertical mode, a horizontal mode, or a diagonal mode.

Preferably, the additional prediction mode may include at least one prediction mode of a block neighboring an upper-left side, a bottom-left side, or an upper-right side of the current block.

Preferably, the additional prediction mode may include a prediction mode closest to a prediction direction of an angular prediction mode in the MPM candidate list.

Preferably, the method may further comprise checking whether a block neighboring a left or upper side of the current block belongs to a different quad-tree block from the current block, wherein the quad-tree block represents a leaf node block of a quad-tree structure.

Preferably, when the block neighboring the left or upper side belongs to the different quad-tree block from the current block as a result of checking, the MPM candidate list may be constructed using the left prediction mode or the upper prediction mode.

Preferably, the method may further comprise, when the block neighboring the left or upper side belongs to the different quad-tree block from the current block as a result of checking, giving a higher priority to the left prediction mode or the upper prediction mode.

In another aspect of the present invention, there is provided a device for processing a video based on an intra-prediction mode, the device comprising a left and upper prediction mode determining unit configured to determine a left prediction mode and an upper prediction mode using a prediction mode of a block neighboring a current block, wherein the left prediction mode and the upper prediction mode are determined based on a split structure of the block neighboring the current block; a most probable mode (MPM) candidate list constructing unit configured to construct a MPM candidate list of the current block using the left prediction mode and the upper prediction mode; a prediction mode determining unit configured to determine a prediction mode of the current block using a MPM index indicating a specific prediction mode in the MPM candidate list; and a prediction block generating unit configured to generate a prediction block of the current block using the prediction mode of the current block.

Advantageous Effects

Embodiments of the present invention can reduce bits for representing an intra-frame prediction mode and improve a compression performance by efficiently constructing a most probable mode (MPM).

Embodiments of the present invention can efficiently construct MPM candidates by considering a probability of selection of a prediction mode of a neighboring block, and thus reduce bits for representing an intra-frame prediction mode.

Embodiments of the present invention can efficiently construct MPM candidates by constructing the MPM candidates considering a block split structure and improve an encoding efficiency of an intra-frame prediction mode.

Effects obtainable from the present invention are not limited by the effects mentioned above, and other effects which are not mentioned above can be clearly understood from the following description by those skilled in the art to which the present invention pertains.

DESCRIPTION OF DRAWINGS

The accompanying drawings, that are included to provide a further understanding of the invention and are incorporated in and constitute a part of the present specification, illustrate embodiments of the invention and together with the description serve to explain various principles of the invention.

FIG. 1 illustrates a schematic block diagram of an encoder in which the encoding of a still image or video signal is performed, as an embodiment to which the present invention is applied.

FIG. 2 illustrates a schematic block diagram of a decoder in which decoding of a still image or video signal is performed, as an embodiment to which the present invention is applied.

FIG. 3 is a diagram for describing a split structure of a coding unit that may be applied to the present invention.

FIG. 4 is a diagram for describing a prediction unit that may be applied to the present invention.

FIG. 5 is an embodiment to which the present invention is applied and is a diagram illustrating an intra-prediction method.

FIG. 6 illustrates a prediction direction according to an intra-prediction mode.

FIG. 7 illustrates a method for constructing a most probable mode (MPM) as an embodiment to which the present invention is applicable.

FIG. 8 illustrates a method for constructing a most probable mode (MPM) as an embodiment to which the present invention is applicable.

FIG. 9 illustrates a method for constructing a most probable mode (MPM) candidate list as an embodiment to which the present invention is applicable.

FIG. 10 is a flow chart illustrating a method for constructing a most probable mode (MPM) candidate list as an embodiment to which the present invention is applicable.

FIG. 11 illustrates a problem that may occur according to a split structure of a neighboring block, as an embodiment to which the present invention is applicable.

FIG. 12 illustrates a method for determining left and upper prediction modes as an embodiment to which the present invention is applicable.

FIGS. 13 and 14 illustrate similarity of a prediction mode with a neighboring block depending on a block split structure, as an embodiment to which the present invention is applicable.

FIGS. 15 and 16 illustrate similarity of a prediction mode with a neighboring block depending on a block split structure as an embodiment to which the present invention is applicable.

FIG. 17 illustrates an intra-prediction method according to an embodiment of the present invention.

FIG. 18 illustrates in detail an intra-prediction unit according to an embodiment of the present invention.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details to provide complete understanding of the present invention. However, it is understood by those skilled in the art that the present invention can be embodied without the particular details.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

Hereinafter, in the present disclosure, "block" or "unit" refers to a unit of performing an encoding/decoding process such as prediction, transform and/or quantization and may include multi-dimensional arrangement of samples (or pixels).

Further, "block" or "unit" may refer to multi-dimensional arrangement of samples with respect to a luma component or multi-dimensional arrangement of samples with respect to a chroma component. In addition, "block" or "unit" may commonly refer to including both multi-dimensional arrangement of samples with respect to a luma component and multi-dimensional arrangement of samples with respect to a chroma component.

For example, "block" or "unit" may be interpreted as the meaning including all of a coding block (CB) which refers to arrangement of samples to be subjected to encoding/decoding, a coding tree block (CTB) consisting of a plurality of coding blocks, a prediction block (PB) (or prediction unit (PU)) which refers to arrangement of samples to which the same prediction is applied, and a transform block (TB) (or transform unit (TU)) which refers to arrangement of samples to which the same transform is applied.

Further, "block" or "unit" may be interpreted as the meaning including a syntax structure used in a process of encoding/decoding arrangement of samples with respect to a luma component and/or a chroma component unless otherwise stated in the present disclosure. Here, the syntax structure refers to 0 or more syntax elements present in a bitstream in a specific order, and the syntax element refers to a data element represented in a bitstream.

For example, "block" or "unit" may be interpreted as the meaning including all of a coding unit (CU) including a coding block (CB) and a syntax structure used for encoding of the coding block (CB), a coding tree unit (CTU) consisting of a plurality of coding units, a prediction unit (PU) including a prediction block (PB) and a syntax structure used for prediction of the prediction block (PB), and a transform unit (TU) including a transform block (TB) and a syntax structure used for transform of the transform block (TB).

In addition, in the present disclosure, "block" or "unit" is not limited to arrangement of samples (or pixels) of a square or rectangular shape and may refer to arrangement of samples (or pixels) of a polygonal shape with three or more vertexes. In this case, "block" or "unit" may be referred to as a polygon block or a polygon unit.

FIG. 1 is illustrates a schematic block diagram of an encoder in which the encoding of a still image or video signal is performed, as an embodiment to which the present invention is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequantization and inverse transformation to the quantized signal through the dequantization unit 140 and the inverse transform unit 150. A reconstructed signal may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality can be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy. In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels as a prediction block.

The intra-prediction unit 182 predicts a current block with reference to samples neighboring the block that is now to be encoded. The intra-prediction unit 182 may perform the following procedure in order to perform intra-prediction. First, the intra-prediction unit 182 may prepare a reference sample necessary to generate a prediction signal. Furthermore, the intra-prediction unit 182 may generate a prediction signal using the prepared reference sample. Furthermore, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

FIG. 2 illustrates a schematic block diagram of a decoder in which decoding of a still image or video signal is performed, as an embodiment to which the present invention is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the prediction signal (or prediction block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In this specification, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

In general, a block-based image compression method is used in the compression technique (e.g., HEVC) of a still image or a video. The block-based image compression method is a method of processing an image by splitting it into specific block units, and may decrease memory use and a computational load.

FIG. 3 is a diagram for describing a split structure of a coding unit which may be applied to the present invention.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(*b*), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3(*b*), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(*b*), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

FIG. 4 is a diagram for describing a prediction unit that may be applied to the present invention.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(b), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(b), a TU(c), a TU(h) and a TU(i) corresponding to the node c, h and I have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

Prediction

In order to reconfigure a current processing unit on which decoding is performed, a decoded part of a current picture or other pictures including the current processing unit may be used.

A picture (slice) using only a current picture for reconstruction, that is, on which only intra prediction is performed, may be called an intra picture or I picture (slice). A picture (slice) using a maximum of one motion vector and reference index in order to predict each unit may be called a predictive picture or P picture (slice). A picture (slice) using a maximum of two motion vectors and reference indices may be called a bi-predictive picture or B picture (slice).

Intra prediction means a prediction method of deriving a current processing block from a data element (e.g., a sample value) of the same decoded picture (or slice). That is, intra prediction means a method of predicting a pixel value of a current processing block with reference to reconstructed areas within a current picture.

Inter prediction means a prediction method of deriving a current processing block based on a data element (e.g., a sample value or a motion vector) of a picture other than a current picture. That is, inter prediction means a method of predicting a pixel value of a current processing block with reference to reconstructed areas within another reconstructed picture other than a current picture.

Hereinafter, intra prediction is described more specifically.

Intra Prediction (or Intra-Frame Prediction)

FIG. 5 is an embodiment to which the present invention is applied and is a diagram illustrating an intra prediction method.

Referring to FIG. 5, the decoder derives an intra prediction mode of a current processing block (S501).

Intra prediction may have a prediction direction for the position of a reference sample used for prediction depending on a prediction mode. An intra prediction mode having a prediction direction is referred to as an intra-angular prediction mode (Intra_Angular prediction mode). In contrast, an intra prediction mode not having a prediction direction includes an intra planar (INTRA_PLANAR) prediction mode and an intra DC (INTRA_DC) prediction mode.

Table 1 illustrates intra-prediction modes and associated names, and FIG. 6 illustrates a prediction direction according to an intra-prediction mode.

TABLE 1

| INTRA-PREDICTION MODE | ASSOCIATED NAMES |
|---|---|
| 0 | Intra-planar (INTRA_PLANAR) |
| 1 | Intra-DC (INTRA_DC) |
| 2 . . . , 34 | intra-angular 2 . . . , intra-angular 34 (INTRA_ANGULAR2 . . . , INTRA_ANGULAR34) |

In intra-prediction, prediction is performed on a current processing block based on a derived prediction mode. A reference sample used for prediction and a detailed prediction method are different depending on a prediction mode. If a current block is an intra-prediction mode, the decoder derives the prediction mode of a current block in order to perform prediction.

The decoder checks whether neighboring samples of the current processing block can be used for prediction and constructs reference samples to be used for the prediction (S502).

In intra-prediction, neighboring samples of the current processing block mean a sample neighboring the left boundary of current processing block of an nS×nS size, a total of 2×nS samples neighboring a bottom left of the current processing block, a sample neighboring the top boundary of the current processing block, a total of 2×nS samples neighboring the top right of the current processing block, and one sample neighboring the top left of the current processing block.

However, some of the neighboring samples of the current processing block have not yet been coded or may not be available. In this case, the decoder may construct reference samples to be used for prediction by substituting unavailable samples with available samples.

The decoder may perform filtering on the reference samples based on the intra-prediction mode (S503).

Whether or not to perform the filtering of the reference samples may be determined based on the size of the current processing block. Furthermore, the filtering method of the reference samples may be determined based on a filtering flag transferred by the encoder.

The decoder generates a prediction block for the current processing block based on the intra prediction mode and the reference samples (S504). That is, the decoder generates a prediction block for the current processing block (i.e., generates a prediction sample within the current processing block) based on the intra prediction mode derived in the intra prediction mode derivation step (S501) and the reference samples obtained in the reference sample configuration step (S502) and the reference sample filtering step (S503).

If a current processing block has been encoded in the INTRA_DC mode, in order to minimize the discontinuity of the boundary between processing blocks, a left boundary sample (i.e., a sample within a prediction block neighboring a left boundary) and top boundary sample (i.e., a sample within a prediction block neighboring a top boundary) of the prediction block may be filtered at step S504.

Furthermore, at step S504, with respect to the vertical mode and horizontal mode of intra-angular prediction modes, as in the INTRA_DC mode, filtering may be applied to a left boundary sample or a top boundary sample.

More specifically, if a current processing block has been encoded in the vertical mode or horizontal mode, a value of a prediction sample may be derived based on a value of a reference sample positioned in the prediction direction. In this case, a boundary sample not positioned in the prediction direction among a left boundary sample or top boundary sample of a prediction block may neighbor a reference sample not used for prediction. That is, the distance from a reference sample not used for prediction may be much closer than the distance from a reference sample used for prediction.

Accordingly, the decoder may adaptively apply filtering to left boundary samples or top boundary samples depending on whether an intra prediction direction is a vertical direction or a horizontal direction. That is, the decoder may apply filtering to left boundary samples if the intra prediction direction is a vertical direction, and may apply filtering to top boundary samples if the intra prediction direction is a horizontal direction.

In HEVC, in order to represent (or signaling) 35 types of prediction modes with fewer bits, the statistical characteristics of an intra-frame prediction (or intra prediction) mode are used.

Since a coding block generally has similar image feature to a neighboring block, it is highly probable that the coding block may also have the same or similar intra-frame prediction mode as the neighboring block. Considering the feature, an encoder/decoder determines a prediction mode of a peripheral block (or neighboring block) and a prediction mode, that occurs most often, as a most probable mode (MPM).

If a prediction mode of a current PU is determined as the MPM, bits used for representing the prediction mode may be saved (represented within 2 bits), but if the prediction mode of the current PU is determined as a prediction mode other than the MPM, since the prediction mode is encoded with one mode among 32 modes except three MPMs, an intra-frame prediction mode may be used by using 5 bits, not 6 bits.

FIG. 7 illustrates a method for configuring a most probable mode (MPM) as an embodiment to which the present invention is applicable.

Referring to FIG. 7, the encoder/decoder encodes/decodes a prediction mode of a current PU based on intra-frame prediction modes of a left PU and an upper PU of the current PU. The encoder/decoder constructs the MPM with reference to an intra-frame prediction mode of a PU including a pixel adjacent to an upper boundary of an above-left pixel of the current PU and an intra-frame prediction mode of a PU including a pixel adjacent to a left boundary of the above-left pixel.

Because blocks neighboring the current block may have different sizes as the block is split in a quad-tree structure, a block adjacent to the left or upper boundary of the current block may have several intra-frame prediction modes. Thus, the encoder/decoder fixes a reference position and refers to an intra-frame prediction mode of a neighboring block.

FIG. 8 illustrates a method for constructing a most probable mode (MPM) as an embodiment to which the present invention is applicable.

Referring to FIG. 8, in case of using 35 prediction modes, the encoder/decoder may construct a total of three prediction modes as the MPM (or MPM candidate or MPM candidate list) with reference to the prediction mode (hereinafter referred to as "L mode") of the left PU and the prediction mode (hereinafter referred to as "A mode") of the upper PU determined by the method illustrated in FIG. 7.

1. First, the encoder/decoder decides whether the L mode and the A mode are the same.

2. If the L mode and the A mode are the same, the encoder/decoder decides whether the L mode is smaller than 2. In other words, the encoder/decoder decides whether the L mode is an angular mode.

3. If the L mode is not smaller than 2 (i.e., if the L mode is an angular mode), the encoder/decoder configures three MPM candidates MPM[0], MPM[1], and MPM[2] to L mode, L mode−1, L mode+1, respectively.

4. If the L mode is smaller than 2, the encoder/decoder configures MPM[0], MPM[1], and MPM[2] to a planar mode, a DC mode, and a vertical mode, respectively.

5. If the L mode and the A mode are the same, the encoder/decoder decides whether both the L mode and the A mode are the planar mode.

6. If both the L mode and the A mode are not the planar mode, the encoder/decoder configures MPM[0], MPM[1], and MPM[2] to the L mode, the A mode, and the planar mode, respectively.

7. If the L mode or the A mode is the planar mode, the encoder/decoder decides whether the L mode and the A mode are respectively the DC mode and the planar mode, or are respectively the planar mode and DC mode.

8. If the A mode is not the DC mode while the L mode is the planar mode, or if the L mode is not the DC mode while the A mode is the planar mode, the encoder/decoder configures MPM[0], MPM[1], and MPM[2] to the L mode, the A mode, and the DC mode, respectively.

9. If the L mode is the DC mode and the A mode is the planar mode, or if the L mode is the planar mode and the A mode is the DC mode, the encoder/decoder configures MPM[0], MPM[1], and MPM[2] to the L mode, the A mode, and the vertical mode, respectively.

FIG. 9 illustrates a method for constructing a most probable mode (MPM) candidate list as an embodiment to which the present invention is applicable.

Referring to FIG. 9, it is assumed that 67 prediction modes are used for an intra-frame prediction. The encoder/decoder may construct MPM candidates (or MPM candidate list) using six prediction modes for coding of an intra-frame prediction mode.

In this instance, as illustrated in FIG. 9, the encoder/decoder may construct MPM candidates using prediction modes of blocks neighboring the left, top, bottom-left, top-right, and above-left sides of a current block. Here, the prediction modes of the blocks neighboring the left, top, bottom-left, top-right, and top-left sides of the current block may be referred to as a left prediction mode, an top prediction mode, a bottom-left prediction mode, an top-right prediction mode, and an top-left prediction mode, respectively.

FIG. 10 is a flow chart illustrating a method for constructing a most probable mode (MPM) candidate list as an embodiment to which the present invention is applicable.

The encoder/decoder constructs MPM candidates using an initial mode in S1001. In the following order, the encoder/decoder may construct six initial modes as the MPM candidates: 1) left prediction mode, 2) upper prediction mode, 3) planar mode, 4) DC mode, 5) bottom-left prediction mode, and 6) upper-right prediction mode.

If six MPM candidates are not completed (e.g., if there is a prediction mode that is not available among the above six initial modes), the encoder/decoder may add an top-left prediction mode to the MPM candidates.

If the MPM candidates are not completed, the encoder/decoder adds a neighboring mode of an angular prediction mode in S1002. In other words, if the six MPM candidates are not completed, the encoder/decoder may select an angular mode among the MPM candidates that have been already inserted, add a prediction mode, that is smaller than the angular mode by 1, to the MPM candidates, and add a prediction mode, that is larger than the angular mode by 1, to the MPM candidates if the six MPM candidates have not been completed.

If the MPM candidates are not completed, the encoder/decoder adds four default modes to the MPM candidates in S1003. In the following order, the encoder/decoder may add four default modes to the MPM candidates: 1) vertical mode, 2) horizontal mode, 3) prediction mode (2), and 4) diagonal mode.

Embodiment 1

In an embodiment of the present invention, an encoder/decoder may construct MPM candidates (or MPM candidate list) considering a probability of occurrence of a prediction mode of a neighboring block.

FIG. 11 illustrates a problem that may occur according to a split structure of a neighboring block, as an embodiment to which the present invention is applicable.

The encoder/decoder may construct MPM candidates using a prediction mode of a block neighboring the left or upper side of a current block. Even when the block is split in a QTBT structure in which quad-tree and binary tree are mixed, as well as when the block is split in a quad-tree structure, the block neighboring the left or upper side of the current block may have several prediction modes according to a split structure.

Referring to FIG. 11(a), it is assumed that the current block and a block (hereinafter referred to as "left neighboring block") neighboring the left side of the current block belong to a leaf node block (hereinafter referred to as "quad-tree block" for convenience) of the same quad-tree structure. If the left neighboring block is split until a depth of a binary tree split is 3 within the quad-tree block, the left neighboring block may be split into four non-square blocks and thus may have four prediction modes as illustrated in FIG. 11(a).

Referring to FIG. 11(b), it is assumed that the left neighboring block belongs to another quad-tree block. In this case, even when the depth of the binary tree split in FIG. 11(b) is 3 in the same manner as FIG. 11(a), the left neighboring block may be split into 16 non-square blocks. Hence, the left neighboring block may have 16 prediction modes.

As illustrated in FIGS. 11(a) and 11(b), a prediction mode of a block neighboring the current block may vary. Although the left or upper prediction mode of the current block may vary depending on a block split structure, the current block cannot sufficiently consider similarity with the neighboring blocks if a reference position of the left prediction mode or the upper prediction mode is fixed as illustrated in FIG. 9. Hence, a coding efficiency of an intra-frame prediction mode may be reduced.

Accordingly, the present invention proposes a method for constructing MPM candidates in consideration of a probability of occurrence of a prediction mode of a neighboring block in order to solve the above-described problem.

Embodiments of the present invention can efficiently construct MPM candidates by considering a probability of occurrence of a prediction mode of a neighboring block, and thus can reduce bits for representing an intra-frame prediction mode and improve a video compression performance.

FIG. 12 illustrates a method for determining left and upper prediction modes as an embodiment to which the present invention is applicable.

The encoder/decoder may construct MPM candidates using a prediction mode that occurs most often among prediction modes of a block neighboring the left or upper side of a current block. For example, the encoder/decoder may count prediction modes of the block neighboring the left or upper side and determine a most counted prediction mode as a left prediction mode or an upper prediction mode.

Referring to FIG. 12(a), it is assumed that a block neighboring the left side of a current block 1201 is split into four blocks. The encoder/decoder counts prediction modes of four left neighboring blocks and determines a most counted prediction mode as a left prediction mode. For example, the encoder/decoder can construct MPM candidates using the left prediction mode by the method illustrated in FIG. 10. Likewise, the encoder/decoder may count prediction modes of the upper neighboring block and determine a most counted prediction mode as an upper prediction mode.

In this instance, the encoder/decoder may count prediction modes of the left or upper neighboring block on a per pixel basis and count prediction modes of the left or upper neighboring block on a per block basis of a previously determined size. Here, the block of the previously determined size may be the same size as a basic unit storing information related to a prediction mode.

If the most counted prediction mode is provided in plural, the encoder/decoder may equally determine a specific prediction mode in various methods. For example, in the case of the left prediction mode, a prediction mode of a neighboring block located on the most upper side among the plurality of prediction modes may be determined as the left prediction mode, or a prediction mode of a neighboring block located on the most bottom side among the plurality of prediction modes may be determined as the left prediction mode.

Referring to FIG. 12(b), it is assumed that a block neighboring the left side of a current block 1202 is split into 16 blocks. In the same manner as FIG. 12(a) except that the number of left neighboring blocks is 16, the encoder/decoder may count prediction modes of left neighboring blocks and determines a most counted prediction mode as a left prediction mode.

The encoder/decoder can construct MPM candidates using the determined left or upper prediction mode.

Embodiment 2

In an embodiment of the present invention, an encoder/decoder may adaptively construct MPM candidates (or MPM candidate list) based on a probability of occurrence of a prediction mode of a neighboring block.

As describe above, a block neighboring a current block according to a block split structure may have several prediction modes. The fact that the current block and the neighboring block have different prediction modes through the split may mean similarity of a prediction mode between the current block and the neighboring block is reduced. This is described with reference to the following figures.

FIGS. 13 and 14 illustrate similarity of a prediction mode with a neighboring block depending on a block split structure as an embodiment to which the present invention is applicable.

Referring to FIG. 13, it is assumed that a block is split in a structure in which a quad-tree structure and a binary tree structure are mixed. It is assumed that a block neighboring the left side of a current block 1301 is split into three blocks, and a block neighboring the above side of the current block 1301 is not split into blocks of a lower depth. For example, the encoder/decoder may construct MPM candidates using prediction modes (i.e., left, above, bottom-left, above-right, and above-left prediction modes) of a block, to which five pixels neighboring the current block 1301 belong, according to the method illustrated in FIG. 9.

In this instance, which of the left prediction mode and the above prediction mode is more similar to a prediction mode of the current block 1301 will be described with reference to FIG. 14.

If the prediction mode of the current block 1301 is the same as or similar to a prediction mode of the left neighboring block, a block including the current block 1301 and the left neighboring block may be split similar to FIG. 14(a) or FIG. 14(b). More specifically, if a prediction mode of all or part of the current block 1301 is the same as the prediction mode (9) or the prediction mode (10), the block split may be performed as illustrated in FIG. 14(a). Further, if a prediction mode of all or part of the current block 1301 is the same as the prediction mode (11), the block split may be performed as illustrated in FIG. 14(b).

Based on this, it is described that the prediction mode of the current block 1301 is more similar to which of the prediction modes, for example, the prediction mode (11) of the left neighboring block and the prediction mode (38) that is a prediction mode of the upper neighboring block. If the prediction mode of the current block 1301 is the same as or similar to the prediction mode of the left neighboring block, the block split is not performed as illustrated in FIG. 13 and can be performed the same as or similar to FIG. 14(a) or FIG. 14(b).

That is, the fact that the block split has been performed as illustrated in FIG. 13 may mean similarity of the prediction mode between the current block 1301 and the left neighboring block is greatly reduced.

Accordingly, supposing that a split structure is determined as illustrated in FIG. 13, it seems that the prediction mode of the current block 1301 is more similar to the prediction mode of the upper neighboring block than the prediction mode of the left neighboring block. Based on this, an embodiment of the present invention proposes a method for adaptively constructing MPM candidates based on a probability of similarity between the prediction modes of the neighboring blocks.

The encoder/decoder may check whether the left or upper neighboring block is split. If the left or upper neighboring block is not split, the encoder/decoder may construct MPM candidates using a prediction mode of the left or upper neighboring block that is not split. If the left or upper neighboring block is split, the encoder/decoder may apply the method described in Embodiment 1 and may construct MPM candidates using a prediction mode with a highest probability of occurrence among left or upper prediction modes.

In an embodiment of the present invention, the encoder/decoder may construct MPM candidates in the following order.

1. The encoder/decoder adds a planar mode.
2. The encoder/decoder adds a DC mode.
3. The encoder/decoder checks whether a left neighboring block is split.
  (1) If the left neighboring block is not split, the encoder/decoder adds a prediction mode of the left neighboring block.
  (2) If the left neighboring block is split, the encoder/decoder adds a prediction mode with the highest probability of occurrence among prediction modes of the left neighboring block. In this case, the encoder/decoder may apply the method of Embodiment 1 described above.
4. The encoder/decoder checks whether an upper neighboring block is split.
  (1) If the upper neighboring block is not split, the encoder/decoder adds a prediction mode of the upper neighboring block.
  (2) If the upper neighboring block is split, the encoder/decoder adds a prediction mode with the highest probability of occurrence among prediction modes of the upper neighboring block. In this case, the encoder/decoder may apply the method of Embodiment 1 described above.
5. The encoder/decoder adds −1 prediction mode of an angular prediction mode of MPM candidates that are added in the steps 3 and 4.
6. The encoder/decoder adds 1 prediction mode of the angular prediction mode of the MPM candidates that are added in the steps 3 and 4.
7. If the left neighboring block is split, the encoder/decoder adds a prediction mode with the second highest probability of occurrence among the prediction modes of the left neighboring block.
8. If the upper neighboring block is split, the encoder/decoder adds a prediction mode with the second highest probability of occurrence among the prediction modes of the upper neighboring block.
9. The encoder/decoder adds −1 prediction mode of an angular prediction mode of MPM candidates that are added in the steps 7 and 8.
10. The encoder/decoder adds +1 prediction mode of the angular prediction mode of the MPM candidates that are added in the steps 7 and 8.
11. The encoder/decoder adds a prediction mode of a bottom-left neighboring block.
12. The encoder/decoder adds a prediction mode of an upper-right neighboring block.
13. The encoder/decoder adds a prediction mode of an upper-left neighboring block.
14. The encoder/decoder adds a vertical mode.
15. The encoder/decoder adds a horizontal mode.
16. The encoder/decoder adds a diagonal mode.
17. The encoder/decoder adds the prediction mode (2).

The encoder/decoder may construct MPM candidates in the above order. In this case, the encoder/decoder may add an available prediction mode in the above order until the number of MPM candidates is filled, and may construct a final MPM candidate according to the number of MPM candidates after constructing all the prediction modes as temporary MPM candidates in the above order. Here, the number of MPM candidates may be previously determined and may be transmitted in unit of sequence, picture, slice, and ending block.

If all the prediction modes are constructed as the temporary MPM candidates, the encoder/decoder may perform each step in the above order. If a prediction mode to be added in each step is already present in the MPM candidates, the encoder/decoder does not add a corresponding prediction mode and may perform the next step. The encoder/decoder may list all the prediction modes added in the above order irrespective of the number of MPM candidates and generate the temporary MPM candidates.

The order of constructing the MPM candidates described above is merely an example, and thus the present invention is not limited thereto. That is, the encoder/decoder may construct the MPM candidates in various methods considering whether each of the left neighboring block and the upper neighboring block is split, and the possibility of occurrence of the prediction mode. For example, the encoder/decoder may construct the MPM candidates using the left prediction mode and the upper prediction mode, that are determined by the above method, through the method illustrated in FIGS. 9 and 10.

In an embodiment of the present invention, the encoder/decoder may reconstruct (or prioritize) the order of the MPM candidates in consideration of a possibility of occurrence of the prediction mode between the MPM candidates.

As described above, when the left or upper neighboring block is not split, similarity of the prediction mode with the current block may be relatively higher than when the left or upper neighboring block is split. Considering this, the encoder/decoder may give higher priority to a prediction mode of a block, that is not split among the left neighboring block and the upper neighboring block.

Based on the order or the priority in the MPM candidate list, a MPM index may be assigned to each prediction mode (or MPM). In this case, the smaller the MPM index is, the fewer bits may be assigned. Thus, the present invention can reduce signaling bits of an intra-frame prediction mode and improve coding efficiency by changing (or prioritizing) the order of a prediction mode with high similarity of the prediction mode with the current block.

For example, the encoder/decoder may reconstruct the order of MPM candidates in the following step. In this instance, it is assumed that the order (or priority) in the MPM list is determined according to the previous order of constructing the MPM candidates.

1. If the left neighboring block is split and the upper neighboring block is not split, the encoder/decoder changes a prediction mode of the upper neighboring block to List 1. In other words, the encoder/decoder gives the highest priority to the upper prediction mode.

2. If the left neighboring block is not split and the upper neighboring block is split, the encoder/decoder changes a prediction mode of the left neighboring block to List 1.

3. If both the left neighboring block and the upper neighboring block are not split, the encoder/decoder changes a prediction mode of the left neighboring block to List 1 and changes a prediction mode of the upper neighboring block to List 2.

4. If both the left neighboring block and the upper neighboring block are split, the encoder/decoder the encoder/decoder maintains the order in the list of the MPM candidates.

Embodiment 3

In an embodiment of the present invention, an encoder/decoder may construct MPM candidates based on a probability of similarity with a neighbor prediction mode.

In a QTBT structure, a coding tree unit (CTU) may be split in a quad-tree structure and a binary tree structure. Here, the CTU is a basic unit for splitting a video (or frame) and represents a coding unit of a maximum size. The CTU may be first split in a quad-tree structure, and then a leaf node (hereinafter referred to as "quad-tree block" for convenience) of the split quad-tree structure may be split in the binary tree structure.

If the quad-tree block is split into a binary tree block, the encoder/decoder may construct MPM candidates considering a split structure of the quad-tree block.

FIGS. 15 and 16 illustrate similarity of a prediction mode with a neighboring block depending on a block split structure, as an embodiment to which the present invention is applicable.

Referring to FIG. 15, it is assumed that a quad-tree block is split in a binary tree structure. If the quad-tree block has been split into a current block 1501, a first binary tree block 1502, and a second binary tree block 1503 as shown in FIG. 15, there is high probability that a prediction mode of the current block 1501 is different from prediction modes of the first binary tree block 1502 and the second binary tree block 1503.

If the current block 1501 has the same prediction mode as the first binary tree block 1502 and the second binary tree block 1503, it is more probable that the block split is performed as shown in FIG. 16.

This is, if the prediction mode of the current block 1501 is the same as the prediction mode of the first binary tree block 1502, a quad-tree block may be split in the binary tree structure as illustrated in FIG. 16(a). On the other hand, if the prediction mode of the current block 1501 is the same as the prediction mode of the second binary tree block 1503, the quad-tree block may be split in the binary tree structure as illustrated in FIG. 16(b). Further, if the prediction mode of the current block 1501 is the same as the prediction modes of the first binary tree block 1502 and the second binary tree block 1503, the quad-tree block may be split in the binary tree structure as illustrated in FIG. 16(c). In summary, the fact that the quad-tree block has been split as illustrated in FIG. 15 may mean that the prediction mode of the current block 1501 is different from the prediction modes of the left neighboring blocks 1502 and 1503.

Accordingly, the embodiment proposes a method for constructing MPM candidates of a block that is split in the binary tree structure from the quad-tree block. The encoder/decoder can construct MPM candidates based on whether a left or upper neighboring block of a current block, that is split in the binary tree structure from the quad-tree block, belongs to the same quad-tree block.

For example, the encoder/decoder may decide whether a neighboring block of the current block belongs to the same quad-tree block. Based on a result of decision, the encoder/decoder may add a prediction mode of the neighboring block belonging to a different quad-tree block to the MPM candidates and may not add a prediction mode of the neighboring block belonging to the same quad-tree block to the MPM candidates.

Alternatively, for example, when the neighboring block of the current block belongs to the same quad-tree block, the encoder/decoder may add the prediction mode of the neighboring block to the MPM candidates if the neighboring block is not split, and may add the prediction mode of the neighboring block to the MPM candidates if the neighboring block is split.

In an embodiment of the present invention, the encoder/decoder can construct MPM candidates in the following order considering whether the neighboring block belongs to the same quad-tree block. The encoder/decoder can construct MPM candidates using a method proposed by the embodiment when a depth of a binary tree split in a current block is equal to or greater than 1 (i.e., when the current block is a block that is split in a binary tree structure from a quad-tree block).

1. The encoder/decoder adds a planar mode.
2. The encoder/decoder adds a DC mode.
3. The encoder/decoder checks whether an upper neighboring block belongs to a leaf node block (i.e., a quad-tree block) of a quad-tree structure that is the same as a current block.

(1) If the upper neighboring block belongs to the same quad-tree block, the encoder/decoder checks whether the upper neighboring block has been split. The encoder/decoder does not add the prediction mode of the upper neighboring block to MPM candidates when the upper neighboring block is split, and adds it to the MPM candidates when the upper neighboring block is not split.

(2) If the upper neighboring block does not belong to the same quad-tree block, the encoder/decoder adds a prediction mode with the highest probability of occurrence among prediction modes of the upper neighboring block and changes it to List 1. In this case, the encoder/decoder may apply the method of Embodiment 1 described above.

4. The encoder/decoder checks whether a left neighboring block belongs to a leaf node block (i.e., a quad-tree block) of a quad-tree structure that is the same as the current block.

(1) If the left neighboring block belongs to the same quad-tree block, the encoder/decoder checks whether the left neighboring block has been split. The encoder/decoder does not add the prediction mode of the left neighboring block to the MPM candidates when the left neighboring block is split, and adds it to the MPM candidates when the left neighboring block is not split.

(2) If the left neighboring block does not belong to the same quad-tree block, the encoder/decoder adds a prediction mode with the highest probability of occurrence among prediction modes of the left neighboring block and changes it to List 1. In this case, the encoder/decoder may apply the method of Embodiment 1 described above.

5. The encoder/decoder adds −1 prediction mode of an angular prediction mode of added MPM candidates.
6. The encoder/decoder adds +1 prediction mode of an angular prediction mode of added MPM candidates.
7. The encoder/decoder adds a prediction mode of a bottom-left neighboring block.
8. The encoder/decoder adds a prediction mode of an upper-right neighboring block.
9. The encoder/decoder adds a prediction mode of an upper-left neighboring block.
10. The encoder/decoder adds a vertical mode.
11. The encoder/decoder adds a horizontal mode.
12. The encoder/decoder adds a diagonal mode.
13. The encoder/decoder adds the prediction mode (2).

The encoder/decoder may construct MPM candidates in the above order. In this case, the encoder/decoder may add an available prediction mode in the above order until the number of MPM candidates is filled, and may construct a final MPM candidate according to the number of MPM candidates after constructing all the prediction modes as temporary MPM candidates in the above order. Here, the number of MPM candidates may be previously determined and may be transmitted in unit of sequence, picture, slice, and ending block.

If all the prediction modes are constructed as the temporary MPM candidates, the encoder/decoder may perform each step in the above order. If a prediction mode to be added in each step is already present in the MPM candidates, the encoder/decoder does not add a corresponding prediction mode and may perform the next step. The encoder/decoder may list all the prediction modes added in the above order irrespective of the number of MPM candidates and generate the temporary MPM candidates.

The order of constructing the MPM candidates described above is merely an example, and thus the present invention is not limited thereto. That is, the encoder/decoder may construct the MPM candidates in various methods considering the split structure of the left neighboring block and the upper neighboring block and the possibility of occurrence of the prediction mode. For example, the encoder/decoder may construct the MPM candidates using the left prediction mode and the upper prediction mode, that are determined by the above method, through the method illustrated in FIGS. 9 and 10.

The embodiments described above may be independently applied, and one or more of the embodiments may be combined and applied.

FIG. 17 illustrates an intra-prediction method according to an embodiment of the present invention.

The encoder/decoder determines a left prediction mode and an upper prediction mode using a prediction mode of a block neighboring a current block in S1701.

In this case, the left prediction mode and the upper prediction mode may be determined based on a split structure of the block neighboring the current block.

As described above, the encoder/decoder may determine the left prediction mode and the upper prediction mode using a prediction mode that occurs most often among prediction modes of a block neighboring the left or upper side of the current block. More specifically, the encoder/decoder may count the number of prediction modes per a pixel adjacent to a left or upper boundary of the current block. The left prediction mode or the upper prediction mode may be determined based on the number of counted prediction modes.

Further, as described above, the encoder/decoder may check whether blocks neighboring the left and upper sides of the current block are split, and may count prediction modes of the left and upper neighboring blocks when the left and upper neighboring blocks are split.

Further, as described above, the encoder/decoder may construct MPM candidates based on whether the left or upper neighboring block of the current block, that is split in a binary tree structure from a quad-tree block, belongs to the same quad-tree block. That is, the encoder/decoder may check whether a block neighboring the left or upper side of the current block belongs to a different quad-tree block from the current block and may construct a MPM candidate list based on a result of decision. Here, the quad-tree block represents a leaf node block of a quad-tree structure.

The encoder/decoder constructs a MPM candidate list of the current block using the left prediction mode and the upper prediction mode in S1702.

As described above, the encoder/decoder may give higher priority to the left prediction mode or the upper prediction mode based on whether a block neighboring the left or upper side of the current block is split.

Further, as described above, the encoder/decoder may construct the MPM candidate list using an additional prediction mode as well as the left prediction mode and the upper prediction mode. Here, the additional prediction mode may include a planar mode, a DC mode, a vertical mode, a horizontal mode, or a diagonal mode. The additional prediction mode may include at least one prediction mode of a block neighboring the upper-left, bottom-left, or upper-right side of the current block. The additional prediction mode may include a prediction mode closest to a prediction direction of an angular prediction mode in the MPM candidate list.

The encoder/decoder determines a prediction mode of the current block using a MPM index indicating a specific prediction mode in the MPM candidate list in S1703.

The encoder/decoder generates a prediction block of the current block using the prediction mode of the current block in S1704.

FIG. 18 illustrates in detail an intra-prediction unit according to an embodiment of the present invention.

FIG. 18 illustrates an intra-prediction unit (182; see FIG. 1, 262; see FIG. 2) as one block for convenience of explanation, but the intra-prediction unit 182 (262) may be implemented by configuration included in the encoder and/or the decoder.

Referring to FIG. 18, the intra-prediction unit 182 (262) implements functions, processes, and/or methods proposed in FIGS. 5 to 17. More specifically, the intra-prediction unit 182 (262) may include a left and upper prediction mode determining unit 1801, a MPM candidate list constructing unit 1802, a prediction mode determining unit 1803, and a prediction block generating unit 1804.

The left and upper prediction mode determining unit 1801 determines a left prediction mode and an upper prediction mode using a prediction mode of a block neighboring a current block.

In this case, the left prediction mode and the upper prediction mode may be determined based on a split structure of the block neighboring the current block.

As described above, the left and upper prediction mode determining unit 1801 may determine the left prediction mode and the upper prediction mode using a prediction mode that occurs most often among prediction modes of a block neighboring the left or upper side of the current block. More specifically, the left and upper prediction mode determining unit 1801 may count the number of prediction modes per a pixel adjacent to a left or upper boundary of the current block. The left prediction mode or the upper prediction mode may be determined based on the number of counted prediction modes.

Further, as described above, the left and upper prediction mode determining unit 1801 may check whether blocks neighboring the left and upper sides of the current block are split, and may count prediction modes of the left and upper neighboring blocks when the left and upper neighboring blocks are split.

Further, as described above, the encoder/decoder may construct MPM candidates based on whether the left or upper neighboring block of the current block, that is split in a binary tree structure from a quad-tree block, belongs to the same quad-tree block. That is, the encoder/decoder may check whether a block neighboring the left or upper side of the current block belongs to a different quad-tree block from the current block and may construct a MPM candidate list based on a result of decision. Here, the quad-tree block represents a leaf node block of a quad-tree structure.

The MPM candidate list constructing unit 1802 constructs a MPM candidate list of the current block using the left prediction mode and the upper prediction mode.

As described above, the MPM candidate list constructing unit 1802 may give higher priority to the left prediction mode or the upper prediction mode based on whether a block neighboring the left or upper side of the current block is split.

Further, as described above, the MPM candidate list constructing unit 1802 may construct the MPM candidate list using an additional prediction mode as well as the left prediction mode and the upper prediction mode. Here, the additional prediction mode may include a planar mode, a DC mode, a vertical mode, a horizontal mode, or a diagonal mode. The additional prediction mode may include at least one prediction mode of a block neighboring the upper-left, bottom-left, or upper-right side of the current block. The additional prediction mode may include a prediction mode closest to a prediction direction of an angular prediction mode in the MPM candidate list.

The prediction mode determining unit 1803 determines a prediction mode of the current block using a MPM index indicating a specific prediction mode in the MPM candidate list.

The prediction block generating unit 1804 generates a prediction block of the current block using the prediction mode of the current block.

The embodiments described above are implemented by combinations of components and features of the present invention in predetermined forms. Each component or feature should be considered selectively unless specified separately. Each component or feature may be carried out without being combined with another component or feature. Moreover, some components and/or features are combined with each other and can implement embodiments of the present invention. The order of operations described in embodiments of the present invention may be changed. Some components or features of one embodiment may be included in another embodiment, or may be replaced by corresponding components or features of another embodiment. It will be apparent that some claims referring to specific claims may be combined with another claims referring to the claims other than the specific claims to constitute the embodiment or add new claims by means of amendment after the application is filed.

Embodiments of the present invention can be implemented by various means, for example, hardware, firmware, software, or combinations thereof. When embodiments are implemented by hardware, one embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present invention can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present invention can be embodied in other specific forms without departing from essential features of the present invention. Accordingly, the aforementioned detailed description should not be construed as limiting in all aspects and should be considered as illustrative. The scope of the present invention should be determined by rational construing of the appended claims, and all modifications within an equivalent scope of the present invention are included in the scope of the present invention.

INDUSTRIAL APPLICABILITY

While the preferred embodiments of the present invention described above are disclosed for illustrative purposes, it will be apparent to those skilled in the art that various improvements, modifications, substitutions, or additions can be made within the technical spirit and the technical scope of the present invention disclosed in the appended claims.

The invention claimed is:

1. A method for processing a video based on an intra-prediction mode, the method comprising:
   determining, by a processor, a left intra prediction mode and an upper intra prediction mode for a current block using prediction modes of blocks neighboring the current block,
   wherein the left intra prediction mode and the upper intra prediction mode for the current block are respectively determined based on a split structure of a block neighboring a left side of the current block and a split structure of a block neighboring an upper side of the current block;
   constructing, by the processor, a most probable mode (MPM) candidate list of the current block using the left intra prediction mode and the upper intra prediction mode for the current block;
   determining, by the processor, an intra prediction mode of the current block using a MPM index indicating a specific prediction mode in the MPM candidate list; and
   generating, by the processor, a prediction block of the current block using the intra prediction mode of the current block.

2. The method of claim 1, wherein the determining of the left intra prediction mode and the upper intra prediction mode for the current block comprises
   counting intra prediction modes per a pixel adjacent to the left or upper side of the current block,
   wherein the left intra prediction mode for the current block or the upper intra prediction mode for the current block is determined based on the counted intra prediction modes.

3. The method of claim 2, wherein the determining of the left intra prediction mode and the upper intra prediction mode for the current block comprises
   checking whether blocks neighboring the left and upper sides of the current block are split,
   when the block neighboring the left side of the current block is split, the left intra prediction mode for the current block is determined based on the counted intra prediction modes per a pixel adjacent to the left side of the current block,
   wherein when a block neighboring the upper side of the current block is split, the upper intra prediction mode for the current block is determined based on the counted intra prediction modes per a pixel adjacent to the upper side of the current block.

4. The method of claim 1, further comprising giving, by the processor, a higher priority to the left intra prediction mode for the current block or the upper intra prediction mode for the current block based on whether a block neighboring the left or upper side of the current block is split.

5. The method of claim 1, wherein the constructing of the MPM candidate list comprises
   adding an additional prediction mode to the MPM candidate list,
   wherein the additional prediction mode includes at least one of a planar mode, a DC mode, a vertical mode, a horizontal mode, or a diagonal mode.

6. The method of claim 5, wherein the additional prediction mode includes at least one prediction mode of a block neighboring an upper-left side, a bottom-left side, or an upper-right side of the current block.

7. The method of claim 5, wherein the additional prediction mode includes a prediction mode closest to a prediction direction of an angular prediction mode in the MPM candidate list.

8. The method of claim 1, further comprising checking, by the processor, whether a block neighboring the left or upper side of the current block belongs to a different quad-tree block from the current block,
   wherein the quad-tree block represents a leaf node block of a quad-tree structure.

9. The method of claim 8, wherein when the block neighboring the left or upper side belongs to the different quad-tree block from the current block as a result of checking, the MPM candidate list is constructed using the left intra prediction mode for the current block or the upper intra prediction mode for the current block.

10. The method of claim 8, further comprising, when the block neighboring the left or upper side belongs to the different quad-tree block from the current block as a result of checking, giving a higher priority to the left intra prediction mode for the current block or the upper intra prediction mode for the current block.

11. A device for processing a video based on an intra-prediction mode, the device comprising:
    a processor configured to:
    determine a left intra prediction mode and an upper intra prediction mode for a current block using an intra prediction mode of a block neighboring the current block,
    wherein the left intra prediction mode and the upper intra prediction mode for the current block are respectively determined based on a split structure of a block neighboring a left side of the current block and a split structure of a block neighboring an upper side of the current block;
    construct a MPM candidate list of the current block using the left intra prediction mode and the upper intra prediction mode for the current block;
    determine an intra prediction mode of the current block using a MPM index indicating a specific prediction mode in the MPM candidate list; and
    generate a prediction block of the current block using the intra prediction mode of the current block.

12. The device of claim 11, wherein the processor is configured to check whether the block neighboring the left side of the current block is split, count first intra prediction modes per a pixel adjacent to the left side of the current block when the block neighboring the left side of the current block is split, and determine a most often occurring first intra prediction mode among the counted first intra prediction modes as the left intra prediction mode for the current block, and
    wherein the processor is configured to check whether the block neighboring the upper side of the current block is split, count second intra prediction modes per a pixel adjacent to the upper side of the current block when the block neighboring the upper side of the current block is split, and determine a most often occurring second intra prediction mode among the counted second intra prediction modes as the upper intra prediction mode for the current block.

13. The device of claim 11, wherein the processor is further configured to give a higher priority to the left intra prediction mode for the current block or the upper intra prediction mode for the current block based on whether a block neighboring the left or upper side of the current block is split.

14. The device of claim 11, wherein the processor is further configured to add an additional prediction mode to the MPM candidate list, and
wherein the additional prediction mode includes at least one of a planar mode, a DC mode, a vertical mode, a horizontal mode, or a diagonal mode.

15. The device of claim 14, wherein the additional prediction mode includes at least one prediction mode of a block neighboring an upper-left side, a bottom-left side, or an upper-right side of the current block.

16. The device of claim 15, wherein the additional prediction mode includes a prediction mode closest to a prediction direction of an angular prediction mode in the MPM candidate list.

17. The device of claim 11, wherein the processor is further configured to check whether a block neighboring the left or upper side of the current block belongs to a different quad-tree block from the current block, and
wherein the quad-tree block represents a leaf node block of a quad-tree structure.

18. The device of claim 17, wherein the processor is configured to construct the MPM candidate list using the left intra prediction mode or the upper intra prediction mode when the block neighboring the left or upper side belongs to the different quad-tree block from the current block.

19. The device of claim 17, wherein the processor is configured to give a higher priority to the left intra prediction mode or the upper intra prediction mode when the block neighboring the left or upper side belongs to the different quad-tree block from the current block.

* * * * *